Aug. 11, 1931.  F. R. McGEE  1,818,905
GAS CLEANER
Filed May 26, 1930   2 Sheets-Sheet 1
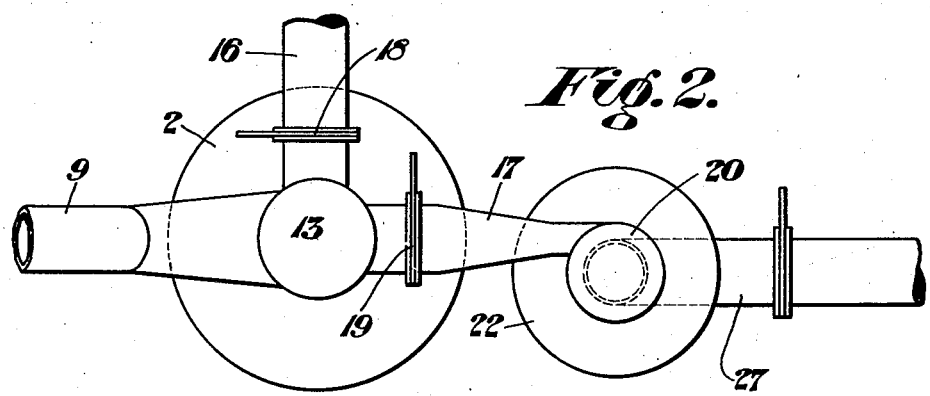
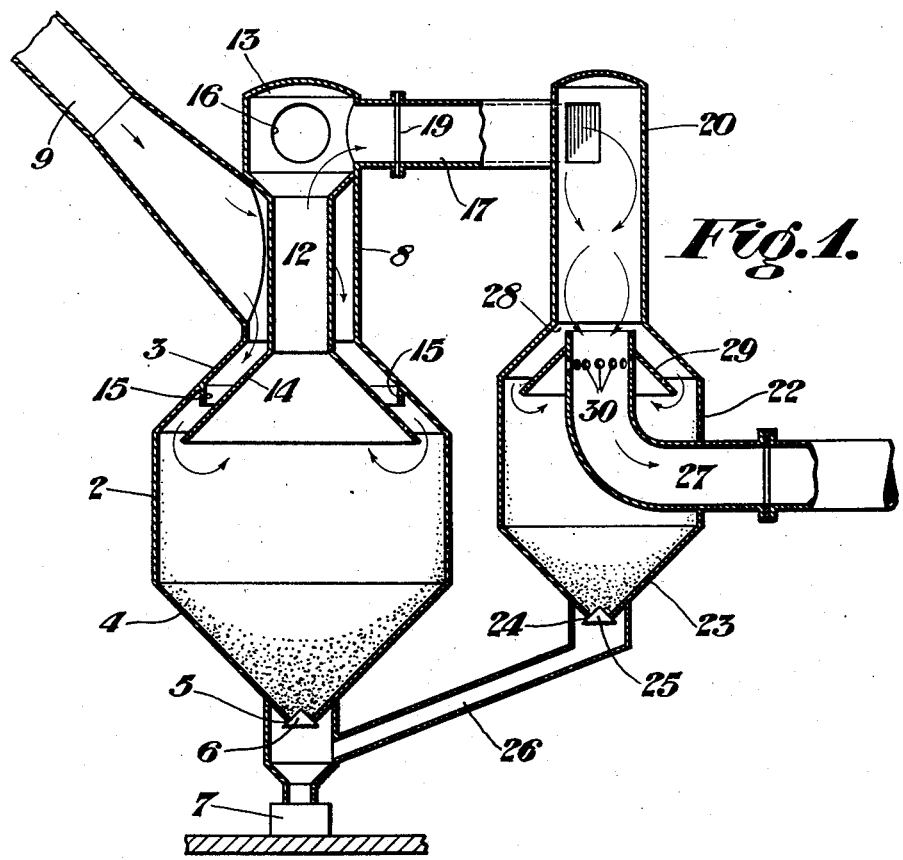
Inventor:
FRANK R. McGEE,
by Usina + Rauber
his Attorneys.

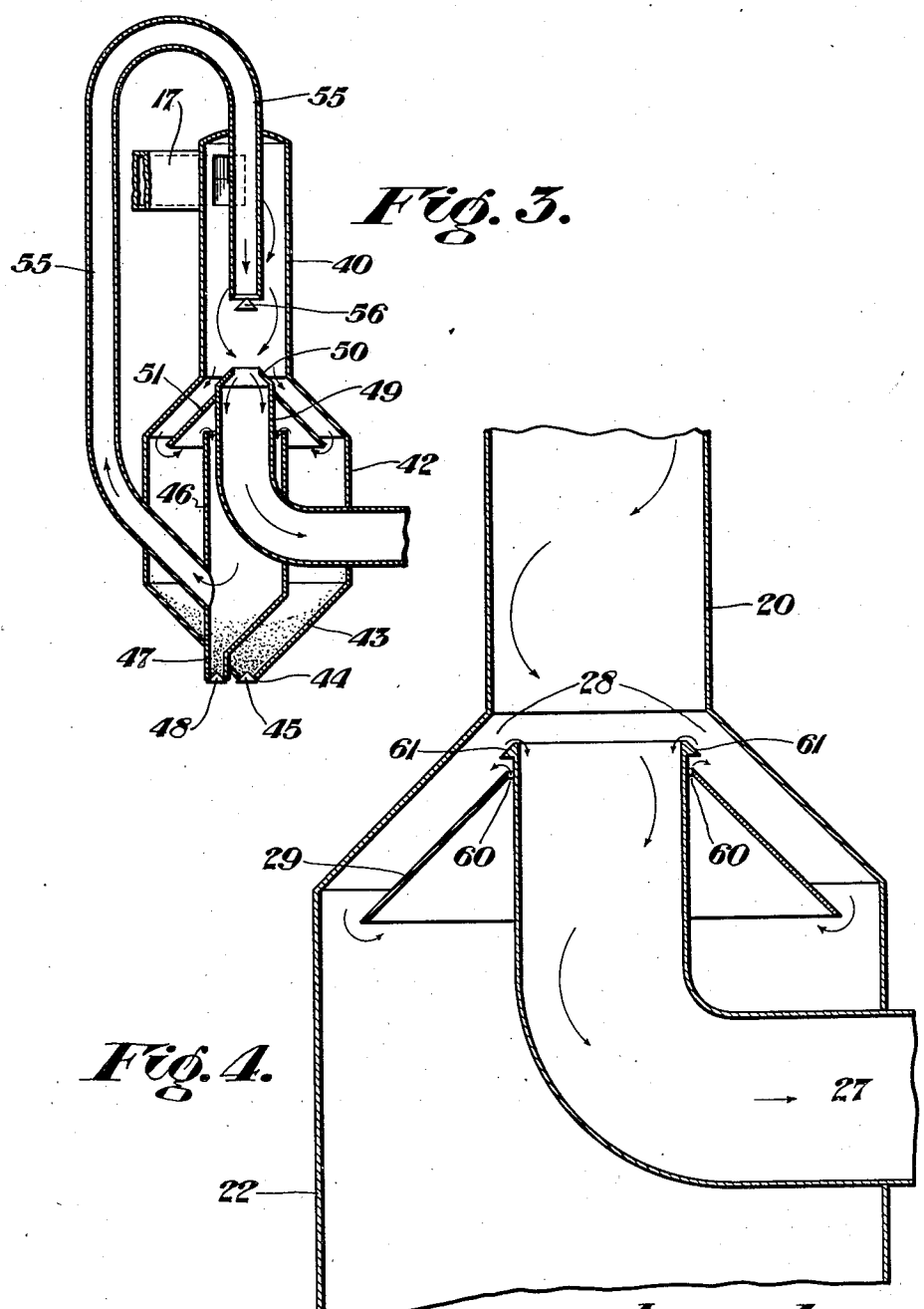

Patented Aug. 11, 1931

1,818,905

UNITED STATES PATENT OFFICE

FRANK R. McGEE, OF STEUBENVILLE, OHIO

GAS CLEANER

Application filed May 26, 1930. Serial No. 455,772.

This invention relates to gas cleaners and more particularly to dry dust cleaners, and has for one of its objects the provision of a novel form of apparatus in which the velocity of the gas to be cleaned is reduced prior to entering the cleaning apparatus so as to cause a more even distribution of the gas throughout the cleaning apparatus and to materially reduce the erosive action of the dust on the cleaner parts.

Another object is to provide means for equally distributing the gases in a restricted annular stream as they enter an enlarged dust collecting chamber where their velocity will be so reduced as to permit the major portion of the dust to settle out of the gas stream by gravity.

A further object is to provide a secondary cleaning apparatus for removing the dust remaining in the gas after it has passed through the primary cleaner by centrifugal force and trapping.

A still further object is to provide a novel gas cleaning apparatus having the novel combination and arrangement of parts hereinafter described and illustrated in the accompanying drawings.

In the drawings:

Figure 1 is a sectional elevation through a gas cleaning apparatus constructed in accordance with this invention.

Figure 2 is a top plan thereof.

Figure 3 is a sectional elevation through a modified form of secondary gas cleaner.

Figure 4 is a fragmentary sectional view showing a modified arrangement of clean gas outlet nozzle for use with a secondary gas cleaner of the type shown in Figure 1.

Referring more particularly to the drawings, the numeral 2 designates a cylindrical dust collecting chamber of the primary dust catcher which has a frusto-conical upper end 3 and an inverted frusto-conical lower end 4. The lower end 4 has a dust discharge port 5 which is normally closed by a valve 6. A pug mill 7 or other means for handling the dust is provided below the discharge port 5 to receive the dust.

A cylindrical gas distributing chamber 8 is mounted on and extends upwardly from the upper end of the dust collecting chamber and communicates therewith. The distributing chamber 8 is of materially less diameter than the collecting chamber 2.

A dirty gas supply conduit 9 communicates with the gas distributing chamber 8 through the sidewall thereof and said conduit has a gradually increased diameter from a point distant from said distributing chamber to said chamber so as to permit expansion of the dirty gas as it flows toward the distributing chamber to thereby slow up or reduce its velocity.

An outlet gas main 12 of materially less diameter than the distributing chamber 8 is arranged centrally of said chamber and has its upper end terminating in an enlarged gas receiving chamber 13. The lower end of the main 12 projects a short distance into the dust collecting chamber 2 and is provided with an outwardly flaring or frusto-conical skirt 14 which is spaced from and parallel with the frusto-conical upper end wall 3 of the dust collecting chamber 2. The space between the skirt 14 and the upper end wall 3 of the dust collecting chamber forms a restricted gas distributing channel or passageway through which the dirty gas is distributed in a restricted annular stream to the dust collecting chamber.

A choke ring or baffle 15 is provided between the skirt 14 and the end wall 3 to cause the gas to distribute equally over the skirt 14 and thereby discharge evenly into the chamber 2.

The gas receiving chamber 13 at the upper or exit end of the outlet gas main 12 is provided with one outlet port connected with a by-pass conduit 16 and a second outlet port connected with a gas supply conduit 17 leading to a secondary cleaner.

The conduits 16 and 17 are provided with control valves 18 and 19, respectively, so that the gas may be directed through either one of said conduits while the other is closed.

The secondary dust catcher which receives the gas previously cleaned in the primary catcher from the conduit 17 comprises a centrifugal gas receiving chamber 20 which is cylindrical in shape and the gas supply conduit 17 enters the sidewall of said chamber tangentially so that the gas when it enters the cylindrical chamber 20 will have a centrifugal motion imparted thereto. The gas will enter the chamber 20 with sufficient velocity to cause the centrifugal force imparted to the gas to throw out the dust and foreign matter against the periphery of the chamber forming an outer layer of dust-laden gas and a central core of clean or substantially dust-free gas.

The lower end of the chamber 20 is connected to and communicates with the upper frusto-conical end of a cylindrical dust collecting chamber 22 of materially greater diameter than the gas receiving chamber 20.

The lower end of the dust collecting chamber 22 is closed by an inverted frusto-conical wall 23 having a dust discharge port 24 at its lower end which is normally closed by a dust valve 25. The port 24 opens into a conduit 26 which leads to the pug mill or other dust handling apparatus 7 of the primary cleaner.

A clean gas outlet nozzle or conduit 27 is arranged centrally within the dust collecting chamber 22 and curves outwardly through the sidewall of said chamber from which point it may extend to any point of gas storage or use.

The conduit 27 is of slightly less diameter than the gas receiving chamber 20 and its open upper end is spaced slightly below the lower end of said chamber so as to trap the central core of clean gas flowing down through the chamber 20 and also to provide an annular trap space 28 for trapping the annular layer of dust-laden gas thrown outwardly against the wall of the chamber 20 by the centrifugal force of the whirling gas stream passing through the chamber 20.

A frusto-conical skirt or apron 29 is mounted around the conduit 27 at a point slightly below the upper end thereof to spread the trapped dust-laden gas evenly around and force said gas outwardly against the sidewall of the dust collecting chamber in an annular stream. The skirt or apron 29 extends parallel with the frusto-conical upper end of the dust collecting chamber and cooperates therewith to form a restricted flow-path for the trapped dust-laden gas.

The dust-laden gas as it passes from over the skirt or apron 29 into the dust collecting chamber 22 suddenly expands and the dust settles out by gravity. The dust-free air then flows upwardly under the apron or skirt 29 and through holes 30 in the conduit 27 into the whirling stream of clean gas.

The secondary dust catcher of Figure 3 is of the same general principle as the secondary cleaner of Figures 1 and 2 except for the recirculation of the gas from the dust collecting chamber. This modified form of secondary cleaner has a centrifugal gas receiving chamber 40, which is cylindrical in shape, and the gas supply conduit 17 enters the sidewall of the chamber tangentially so that a centrifugal motion is applied to the gas as it enters the chamber.

The lower end of the chamber 40 is connected to and communicates with the upper frusto-conical end of a cylindrical dust collecting chamber 42 of materially greater diameter than the gas receiving chamber 40.

The lower end of the dust collecting chamber 42 is closed by a frusto-conical wall 43 having a dust discharge port 44 at its lower end which is normally closed by a dust valve 45. A relatively small diameter gas receiving chamber 46 is arranged centrally within the dust collecting chamber 42 and is provided with a dust discharge leg 47 which extends through the inverted frusto-conical bottom wall of the dust collector and is normally closed by a dust valve 48.

A clean gas outlet nozzle 49 extends through the sidewall of the dust collecting chamber 42 and through the gas receiving chamber 46 and is curved upwardly so as to extend upwardly centrally through and beyond the upper end of the chamber 46 and into the chamber 40. The upper end of the nozzle 49 is contracted, as at 50, and is adapted to trap the central core of clean or dust-free gas from the whirling stream in the chamber 40 while the dust-laden layer of gas is trapped around the nozzle 49.

A frusto-conical skirt or apron 51 is mounted around the conduit 49 at a point slightly below the upper end thereof to spread the trapped dust-laden gas evenly around and force said gas outwardly against the sidewall of the dust collecting chamber in an annular stream.

The dust-laden gas as it passes from over the skirt or apron 51 into the dust collecting chamber suddenly expands and the dust settles out by gravity. The dust-free air then flows upwardly and is drawn into the chamber 46 and through a recirculating conduit 55.

The recirculating conduit 55 extends outwardly through the wall of the dust collecting chamber and then upwardly to a point above the upper end of the gas receiving chamber 40 and is then curved downwardly and passes centrally within the gas receiving chamber 40 and terminates at a point materially above the outlet nozzle 49. The gas is caused to flow through the conduit 55 due to the suction action of the partial vacuum created at the discharge end of the conduit 55 by the centrifugal action of the whirling gas in the chamber 40.

A deflecting cone 56 is arranged at the discharge end of the conduit 55 to cause the recirculated gas to spread or pass outwardly into the whirling stream of gas passing through the chamber 40 and prevent it short-circuiting to the nozzle 49.

In case any dust is carried over into the chamber 46 it will settle out of the gas during its passage through said chamber, this settling action being aided by the change of direction of the gas flow as it turns to pass through the conduit 55. The dust settling out of the gas in the chamber 46 will be collected in the lower end thereof and discharged through the dust leg 47.

In Figure 4 I have shown a modified arrangement for recirculating or permitting the escape of gas from the dust collecting chamber 22 of the secondary dust catcher of Figure 1. In this modified construction the skirt or apron 29 is spaced slightly away from the outlet conduit 27 to form a passageway 60 for the gas to escape from the dust collecting chamber into the stream of dust-laden gas passing between the skirt or apron 29 and the frusto-conical upper end of the dust collecting chamber. A gas baffle ring 61 is provided around the outer periphery of the upper end of the outlet conduit 27 and is spaced from the upper end of the skirt or apron 29 so as to overlie the passageway 60. The baffle ring 61 prevents the short-circuiting of the major portion of the gas passing through the passageway 60 and forces the gas out into the stream of dust-laden gas. However, some of the gas will pass upwardly and into the stream of clean gas passing through the nozzle or outlet conduit 27.

In operation the gas to be cleaned will flow through the conduit 9 and, due to the gradual enlargement of the conduit as it approaches the primary dust catcher the gas will expand and therefore have its velocity reduced. The gas will pass from the conduit 9 into the gas distributing chamber 8 of the primary dust catcher in a slow moving stream and will flow down over the conical skirt 14 which will spread the gas out into an annular stream. As the gas passes from over the skirt 14 into the dust collecting chamber 2 it will suddenly expand and thereby cause the major portion of its dust content to drop out by gravity.

The expanded stream of gas from which the major portion of the dust has been removed will then turn upward and flow through the outlet conduit 12 and into the receiving chamber 13.

When the secondary dust catcher is used the valve 18 will be closed and the valve 19 opened so that the gas will flow through the conduit 17 and be discharged tangentially into the chamber 20 of the secondary dust catcher. The tangential discharge of the gas into the chamber 20 will impart a whirling motion to the gases, thereby throwing the dust and foreign matter outwardly forming an annular layer of dirty gas and an inner core of clean gas. The whirling stream of gas will flow downwardly through the chamber 20 and the core of clean gas will be trapped by the outlet nozzle 27 while the annular layer of dust-laden gas will be trapped by the passageway 28 and forced to flow into the dust collecting chamber 22.

The dirty or dust-laden gas entering the chamber 22 will expand so as to permit the dust to drop out of the gas by gravity and the relatively dust-free gas will flow upwardly under the skirt or apron 29 and escape through the openings or holes 30 into the stream of clean gas passing through the outlet conduit 27.

While I have shown and described certain specific embodiments of my invention it will be understood that I do not wish to be limited thereto since various modifications may be made without departing from the scope thereof, as defined in the appended claims.

I claim:

1. A dry gas cleaner comprising a primary dust catcher in combination with a secondary dust catcher, said primary dust catcher comprising a dust collecting chamber, a gas distributing chamber arranged above and in communication with said dust collecting chamber, a dirty gas supply conduit in communication with said gas distributing chamber, said dirty gas supply conduit having its diameter increased from a point adjacent said gas distributing chamber toward said chamber so as to cause the dirty gas to expand and move at reduced velocity into said chamber, means for causing the gas to spread out and enter said dust collecting chamber in a slow moving annular stream, a gas outlet conduit extending upwardly from the center of the upper end of said dust collecting chamber, a gas receiving chamber at the upper end of said gas outlet conduit, a gas supply conduit leading from said gas receiving chamber to said secondary cleaner, a gas by-pass conduit leading from said gas receiving chamber, and valves for controlling the flow through said last named gas supply conduit and said by-pass conduit.

2. A dry gas cleaner comprising a primary dust catcher in combination with a secondary dust catcher, said primary dust catcher comprising a dust collecting chamber, a gas distributing chamber arranged above and in communication with said dust collecting chamber, a dirty gas supply conduit in communication with said gas distributing chamber, said dirty gas supply conduit having its diameter increased from a point adjacent said gas distributing chamber toward said chamber so as to cause the dirty gas to expand and move at reduced velocity into said chamber, means for causing the gas to spread out and enter said dust collecting chamber in a slow moving annular stream, a gas outlet conduit extending upwardly from the center of the upper end of said dust collecting chamber, and means for conducting the gas from said gas outlet conduit to said secondary cleaner, said means having a tangential connection with said secondary cleaner so as to impart a centrifugal motion to the gases as they enter said secondary cleaner.

3. A dry gas cleaner comprising a primary dust catcher in combination with a secondary dust catcher, said primary dust catcher comprising a dust collecting chamber, a gas distributing chamber arranged above and in communication with said dust collecting chamber, a dirty gas supply conduit in communication with said gas distributing chamber, said dirty gas supply conduit having its diameter increased from a point adjacent said gas distributing chamber toward said chamber so as to cause the dirty gas to expand and move at reduced velocity into said chamber, a gas outlet conduit arranged centrally within said gas distributing chamber and having its inlet end terminating at the upper end of said dust collecting chamber, said dust collecting chamber being of a materially greater diameter than said gas distributing chamber and having a frusto-conical upper end, the apex of which connects with said gas distributing chamber, a frusto-conical skirt on the lower end of said gas outlet conduit and spaced from the walls of the frusto-conical upper end of said dust collecting chamber to cause the gases entering said dust collecting chamber to flow in an annular stream, means for baffling and choking the stream of gases flowing between said skirt and the frusto-conical upper end of said dust collecting chamber, and means for conducting the gases from the upper end of said gas outlet conduit to said secondary cleaner.

4. A dry gas cleaner comprising a primary dust catcher in combination with a secondary dust catcher, said primary dust catcher comprising a dust collecting chamber, a gas distributing chamber arranged above and in communication with said dust collecting chamber, a dirty gas supply conduit in communication with said gas distributing chamber, said dirty gas supply conduit having its diameter increased from a point adjacent said gas distributing chamber toward said chamber so as to cause the dirty gas to expand and move at reduced velocity into said chamber, a gas outlet conduit arranged centrally within said gas distributing chamber and having its inlet end terminating at the upper end of said dust collecting chamber, said dust collecting chamber being of a materially greater diameter than said gas distributing chamber and having a frusto-conical upper end, the apex of which connects with said gas distributing chamber, a frusto-conical skirt on the lower end of said gas outlet conduit and spaced from the walls of the frusto-conical upper end of said dust collecting chamber to cause the gases entering said dust collecting chamber to flow in an annular stream, means for baffling and choking the stream of gases flowing between said skirt and the frusto-conical upper end of said dust collecting chamber, a gas receiving chamber at the upper end of said gas outlet conduit, and a gas supply conduit leading from said gas receiving chamber to said secondary cleaner, said gas supply conduct having a tangential connection with said secondary cleaner so as to impart a centrifugal motion to the gases as they enter said secondary cleaner.

5. A dry gas cleaner comprising, in combination, a primary dust catcher, and a secondary dust catcher adapted to receive the partially cleaned gas from said primary dust catcher, said secondary dust catcher comprising a cylindrical centrifugal gas receiving chamber, means for conducting the partially cleaned gas from said primary dust catcher to the gas receiving chamber of said secondary dust catcher, said means discharging the gas tangentially into said gas receiving chamber so as to impart a centrifugal force thereto, a dust collecting chamber below and communicating with the lower end of said gas receiving chamber, a clean gas outlet nozzle arranged centrally within said dust collecting chamber, said nozzle having a slightly less diameter than said gas receiving chamber and having its inlet end terminating slightly short of the lower end of said gas receiving chamber so as to provide an annular trapping space to trap the outer layer of dust-laden gases thrown outwardly by the centrifugal motion of the gas as it passes through said receiving chamber, and a frusto-conical skirt secured to said clean gas outlet nozzle at a point slightly below the upper end thereof for causing the trapped dust-laden gas to spread outwardly in an annular stream around the walls of the dust collecting chamber.

6. A dry gas cleaner comprising, in combination, a primary dust catcher, and a secondary dust catcher adapted to receive the partially cleaned gas from said primary dust catcher, said secondary dust catcher comprising a cylindrical centrifugal gas receiving chamber, means for conducting the partially cleaned gas from said primary dust catcher to the gas receiving chamber of said secondary dust catcher, said means discharging the gas tangentially into said gas receiving chamber so as to impart a centrifugal force thereto, a dust collecting chamber below and communicating with the lower end of said gas receiving chamber, a clean gas outlet nozzle arranged centrally within said dust collecting chamber, said nozzle having a slightly less diameter than said gas receiving chamber and having its inlet end terminating slightly short of the lower end of said gas receiving chamber so as to provide an annular trapping space to trap the outer layer of dust-laden gases thrown outwardly by the centrifugal motion of the gas as it passes through said receiving chamber, means for causing the trapped dust-laden gas to spread outwardly in an annular stream around the walls of the dust collecting chamber, and means for bleeding gas out of the dust collecting chamber and directing it into the flow of cleaned dust-free gas.

In testimony whereof, I have hereunto set my hand.

FRANK R. McGEE.